Patented Oct. 14, 1947

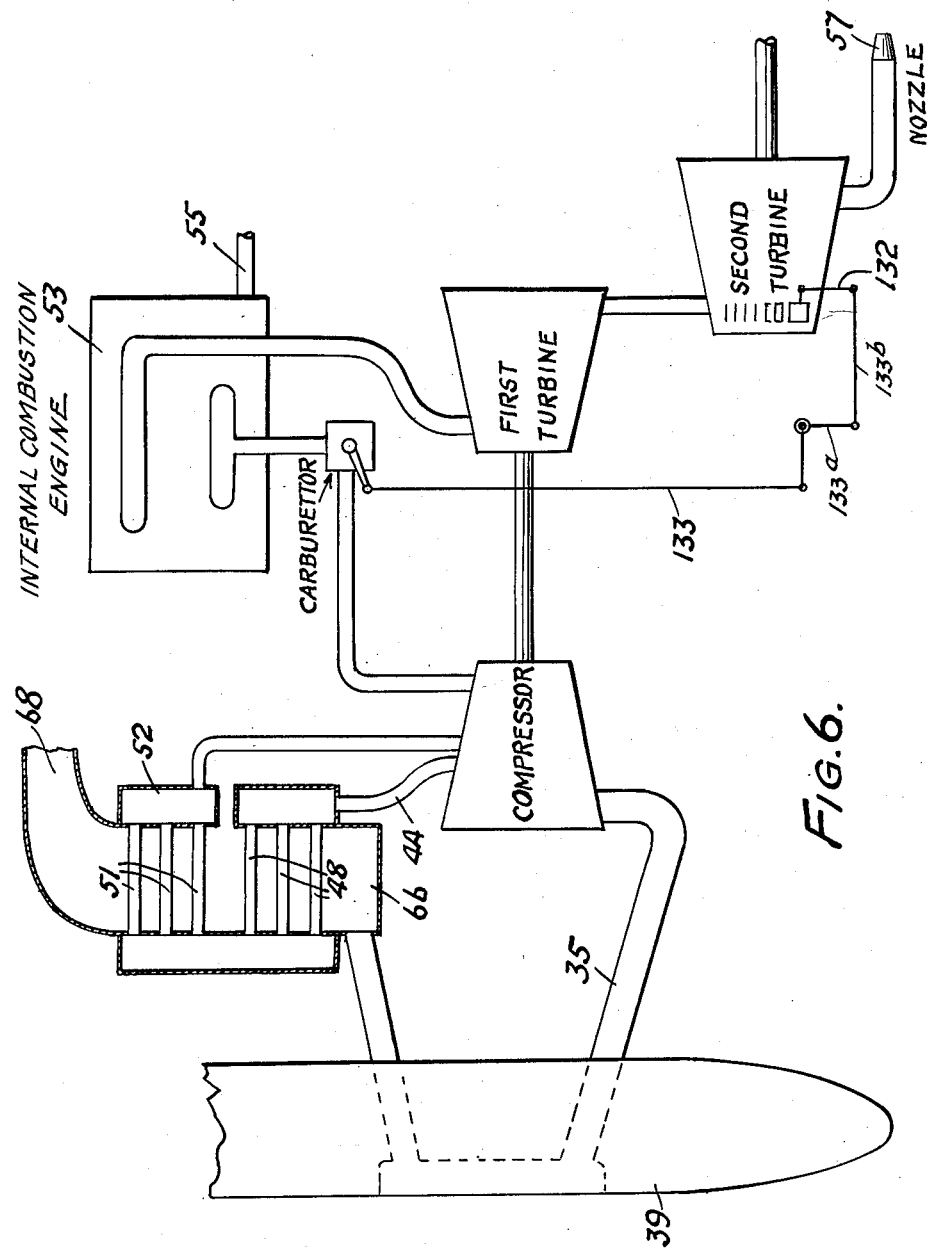

2,428,830

UNITED STATES PATENT OFFICE 2,428,830

REGULATION OF COMBUSTION GAS TURBINES ARRANGED IN SERIES

Rudolph Birmann, Newtown, Pa., assignor, by mesne assignments, to Turbo Engineering Corporation, a corporation of Delaware Application April 18, 1942, Serial No. 439,570

5 Claims. (Cl. 60—41)

This invention relates to a turbine unit adapted primarily for the propulsion of aircraft, though it will be evident that features of the unit are applicable for other power-producing purposes. The unit is particularly designed to convert the heat energy obtained by combustion of fuel directly into mechanical energy by expansion of the combustion gases in a turbine without the intermediate use of an engine, though it will be obvious that various features of the invention are applicable to the use of exhaust gases from an internal combustion engine to drive a turbine to effect supercharging or other end.

In my application Serial No. 439,569, filed April 18, 1942, there are described various power plant arrangements in which a main turbine is provided to supply mechanical power, being driven by products of combustion produced by the burning of fuel in air compressed by a centrifugal compressor driven by a second turbine. This second turbine is driven by the products of combustion exhausted from the first turbine. Said arrangement is thoroughly satisfactory to provide a light and compact power plant, particularly adapted for aircraft needs, and control of such power plant may be effected as described in said application.

By reversing the order of the turbines of that arrangement, there may also be provided a very efficient, compact and light power plant having substantial advantages in the way of simplicity of control, for regulation both of the power output of the plant and its adjustment to operate at different altitudes. In this arrangement, specifically, the first stage turbine is arranged to drive a compressor supplying air for combustion, and the combustion gases are used to drive this first stage turbine. From this first stage turbine, in which ordinarily the power of the driving gases is used to only a relatively small degree, since the turbine desirably drives only the compressor, the gases pass to a second turbine, which is the one designed to produce mechanical power. Control of the entire unit may be very simply secured merely by control of the flow of gases to this second turbine, whereby a greater or less back pressure is imposed on the first turbine, causing it to produce more or less power for driving the compressor. By this simple control, the parts of the entire unit are caused to operate in precisely the fashion necessary for proper aircraft control under different conditions and at different altitudes. One object of the invention relates to the matter just mentioned.

While the second turbine which has been mentioned may supply mechanical power, for example, to drive a propeller, this operation may be a relatively minor one, the second turbine being primarily designed to produce suitable propulsion jet velocities of the combustion gases, and, for example, being designed to drive a second compressor or the like for the production of air under compression to provide an additional jet or to mingle with the combustion gases to produce a single jet of a proper velocity for propulsion purposes.

Still further objects of the invention relate to the arrangement of parts of the power plant and controls thereof, which objects, as well as those relating to other details, will become apparent from the following description, read in conjunction with the accompanying drawings, in which:

Figure 5 is a reduced scale diagrammatic sectional view taken as indicated at 5—5 in Figure 3, showing the combustion chamber arrangement, with a thermostat valve controlled by a thermostat in the gas chest, for controlling the fuel supply;

Figure 6 is a diagram illustrating a power plant, including an internal combustion engine.

Figures 1, 2 and 3 illustrate in sequence the portions of the power plant from the front portion to the rear thereof, the portions of the several figures slightly overlapping to illustrate their relation to each other.

Figure 2:
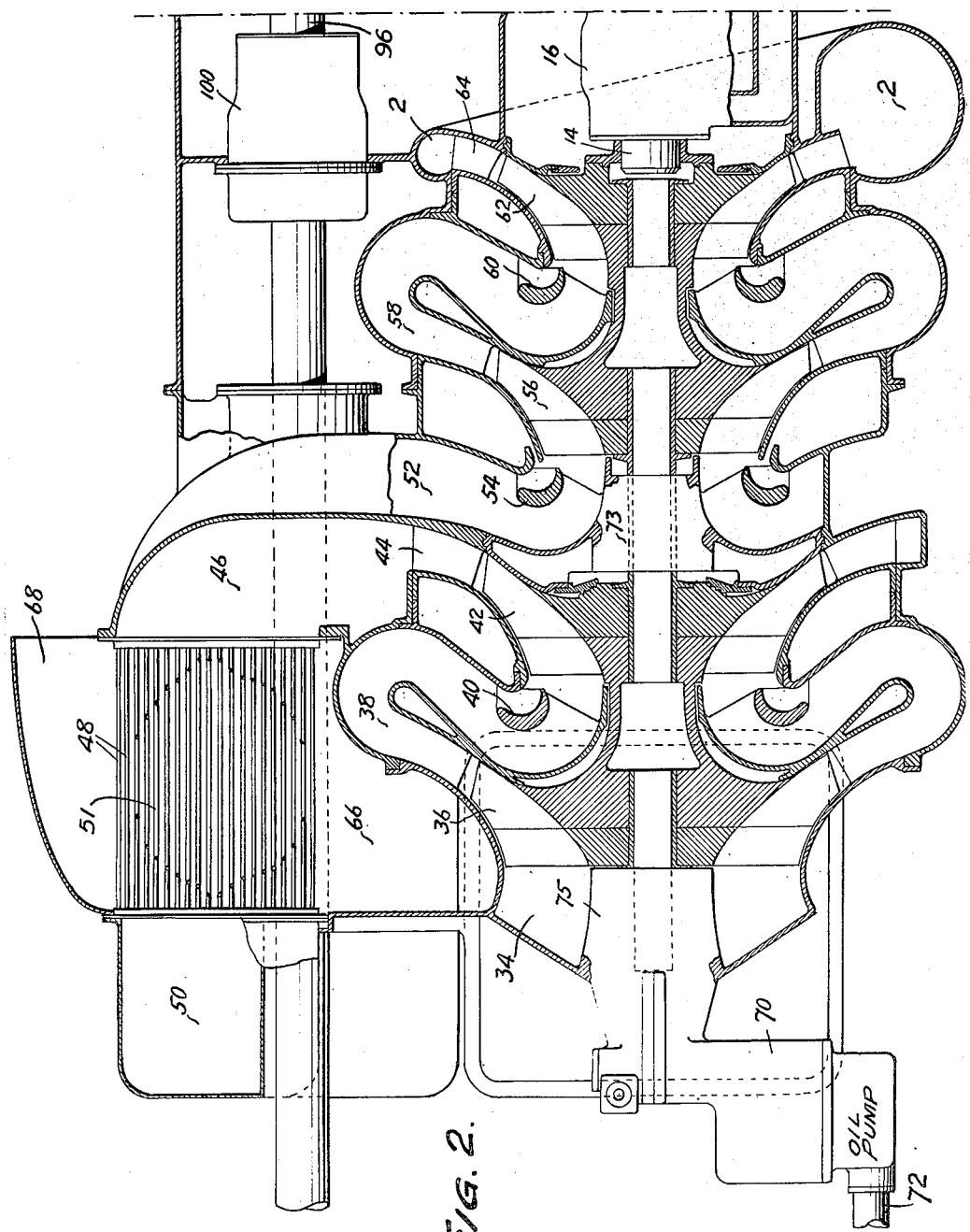
Figure 2 is a vertical section showing the compressor and intercooler features of the power plant.
Figure 3:
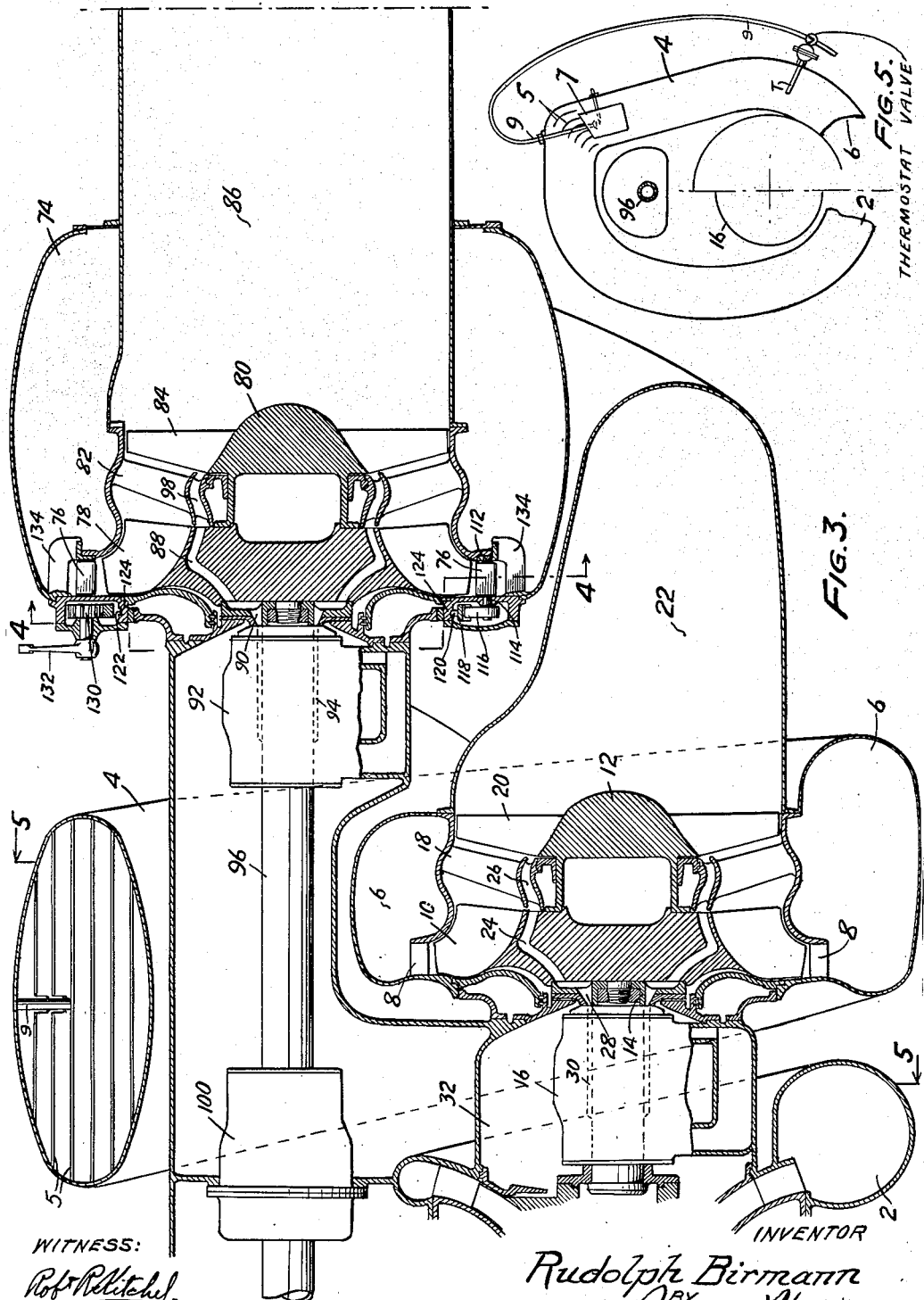
Figure 3 is a vertical section showing the high and low pressure turbines.
Figure 4:
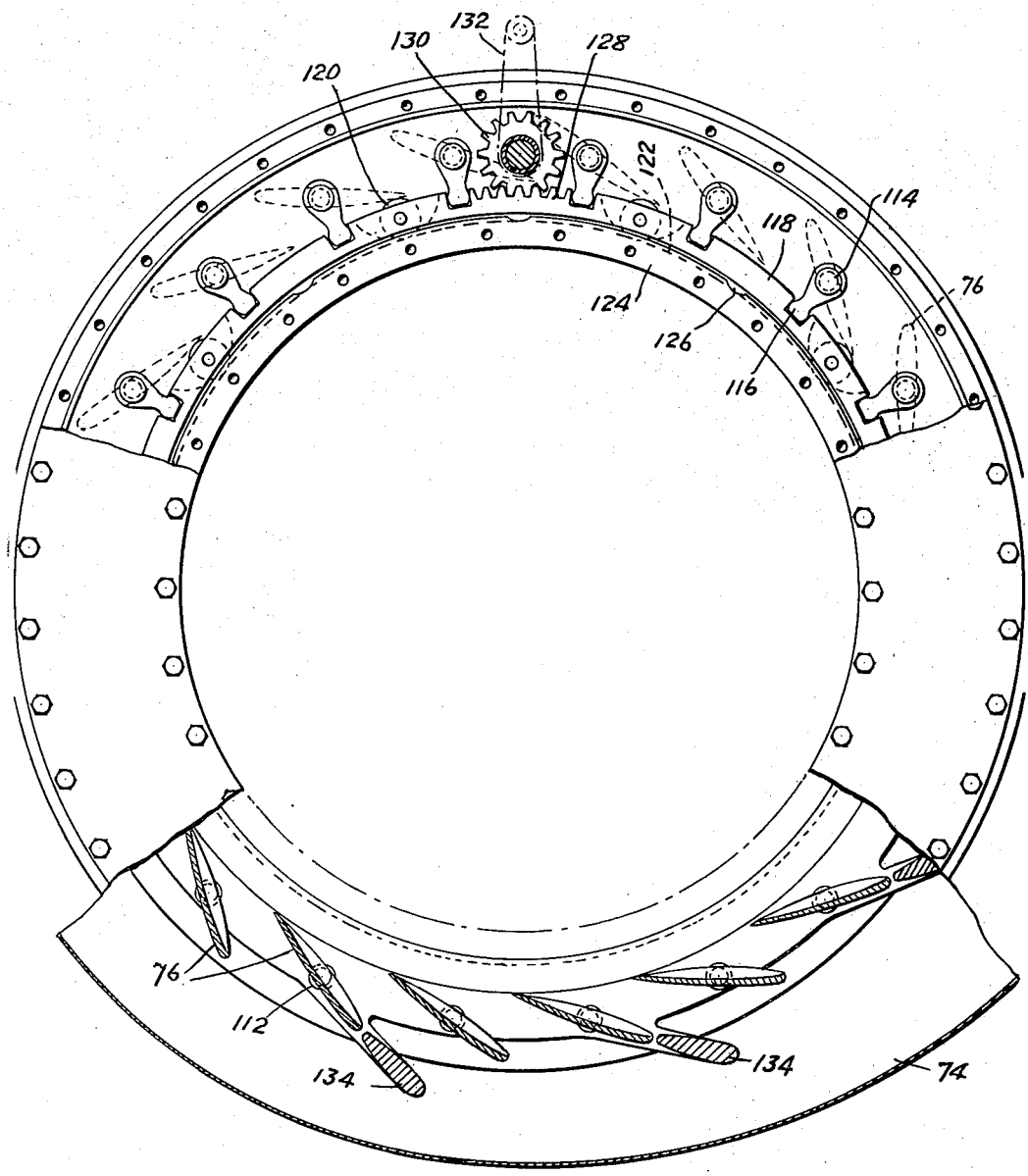
Figure 4 is a vertical section taken on the broken surface the trace of which is indicated at 4—4 in Figure 3.

The description of the power plant may be best started by considering first the compressed air passage 2 illustrated in both Figures 2 and 3. This passage is connected to a combustion chamber 4 containing a jacketed burner 7 to which fuel is introduced, under thermostatic control as described below, through line 9 and burned in the compressed air guided to and about the burner by guide vanes 5, the construction and operation in this respect being generally similar to what is described in my application Serial No. 439,569, filed April 18, 1942. This combustion chamber may take various forms, and need not be described specifically herein, being shown diagrammatically in Figure 5. The hot products of combustion from the chamber 4 pass to the gas chest 6 of the high pressure turbine, from which they are directed through nozzles 8 into the primary gas passages 10 in the multi-part high pressure turbine rotor 12, which is carried in overhanging fashion by a shaft 14 mounted in a bearing 16. The bucket passages 10 are defined by blading to provide a primary stage in which flow takes place to a major extent in an inward radial direction at the entrance with axial deflection of flow at the exit of that stage. Stationary vanes 18 deflect the gases leaving the first stage to enter passages 20 of a second stage of the high pressure turbine, these passages being defined by vanes and arranged so that the flow therethrough is primarily axial. The gases discharged therefrom pass into the region 22, from which they flow to the low pressure turbine stage, as will be hereafter described. In order to cool the rotor, and in particular prevent substantial heating of the bearing 16, the rotor is provided with passages indicated at 24, inwardly of the bucket passages. These passages discharge the air into guiding passages 26, wherein it is kept from mixing with the gases passing between the vanes 18 by annular walls, as indicated. From the passages 26, the air is discharged through the portions of the passages 20 adjacent the hub, so as to provide a boundary layer of relatively cool gas, separating the hub from the hot driving gases. By thus maintaining the cooling air separate from the combustion gases through substantially the entire axial extent of the rotor, more effective cooling can be secured than if the air was permitted to diffuse with the combustion gases, as would occur in the absence of the separate passages 26. To avoid leakage losses, the inner annular boundary portions of the passages 26 are inset, as indicated, in a groove portion of the hub 12. The passages 24 receive their air from the continuations 28 of axial grooves extending along the outside of the shaft 30 within the bearing elements. The construction here involved is preferably that illustrated in my Patent No. 2,403,489, dated July 9, 1946. By such construction, a damped elastic bearing is provided, with adequate cooling, cooling air being received from the chamber 32 surrounding the bearing.

The arrangement of the cooling passages 24 is such as to result in substantial recovery of energy from the cooling air. For this purpose, they are arranged in accordance with the principles set forth in my Patent No. 2,283,176, dated May 19, 1942, i. e., the cooling air is first compressed by reason of radial outward deflection of the cooling air passages, is then substantially heated, and is subsequently discharged rearwardly of the direction of rotation to impart driving torque to the turbine rotor. In the present case, the expansion and driving effect of this cooling air takes place in two stages, first in the discharge ends of passages 24, and then, after deflection in the passages 26, by reexpansion in the inner portions of the secondary stage passages 20.

The shaft 14 is connected on the forward side of the bearing 16 with a four stage centrifugal compressor, illustrated in Figure 2. It has been found advantageous to provide such compressor by an assembly of hub portions without necessarily providing a continuous shaft extending through all of them. The particular arrangement of these hub portions forms no part of the invention claimed herein, and is illustrated diagrammatically, it being understood that the portions are secured together by bolting or in other fashion with associated tubular shaft portions, so that in general the compressor assembly is hollow along its axis. Bearing 73 and a bearing in a housing 75 support the compressor.

The first stage of the compressor receives its air from the chamber 34. If the power plant is used for aircraft driving purposes, the chamber 34 is connected by one or more passages 35 running as directly as possible to air intake openings, located in the leading edges of the airplane wings and desirably in the slip stream of the propeller or propellers so as to secure a ram effect giving an initial compression, in view of diffuser action in these passages, to the air within the chamber 34 (see application Serial No. 439,569, referred to above, also Fig. 6). The air from this chamber is compressed in the passages 36 of the first stage impeller, from which it is discharged into the diffuser and cross-over passage 38, where its kinetic energy is transformed into pressure energy and it is delivered substantially without spin to the second stage impeller. To secure proper guidance at the high velocities involved, annular streamlined deflectors 40 are provided adjacent the discharge ends of these passages. The construction involved is desirably that described in detail in my Patent No. 2,419,669 dated April 29, 1947.

The second stage impeller 42 delivers air through the diffuser 44 to the entrance header 46 of the intercooler through which the air passes first forwardly through a series of tubes 48 to the intermediate header 50 and thence backwardly through another set of tubes 51 (some of the tubes 48 being broken away to show the tubes 51) parallel to the tubes 48 into a passage 52, wherein the flow is directed, with the aid of streamlined deflectors 54 between vanes in said passage, to the entrance of the third stage impeller 56. From this impeller the air flows through the diffuser and transfer passages 58, with guidance at 60, to the entrance of the fourth stage impeller 62, the diffuser and transfer passages being the same as those between the first and second stages. From the impeller 62, the air is delivered through the diffuser passages 64 and into the compressed air passages 2 described above.

Cooling air for the intercooler enters at 66 from connections preferably to one or more openings in the leading edges of the wings 39, as illustrated in said application Serial No. 439,569 as well as added Fig. 6, and flows from 66 across the tubes 48 and the return tubes 51 passing therefrom through the discharge opening 68, about the combustion chamber and the combustion gas chests, thereafter passing along with the combustion gases from the rear of the power plant.

Figure 1:
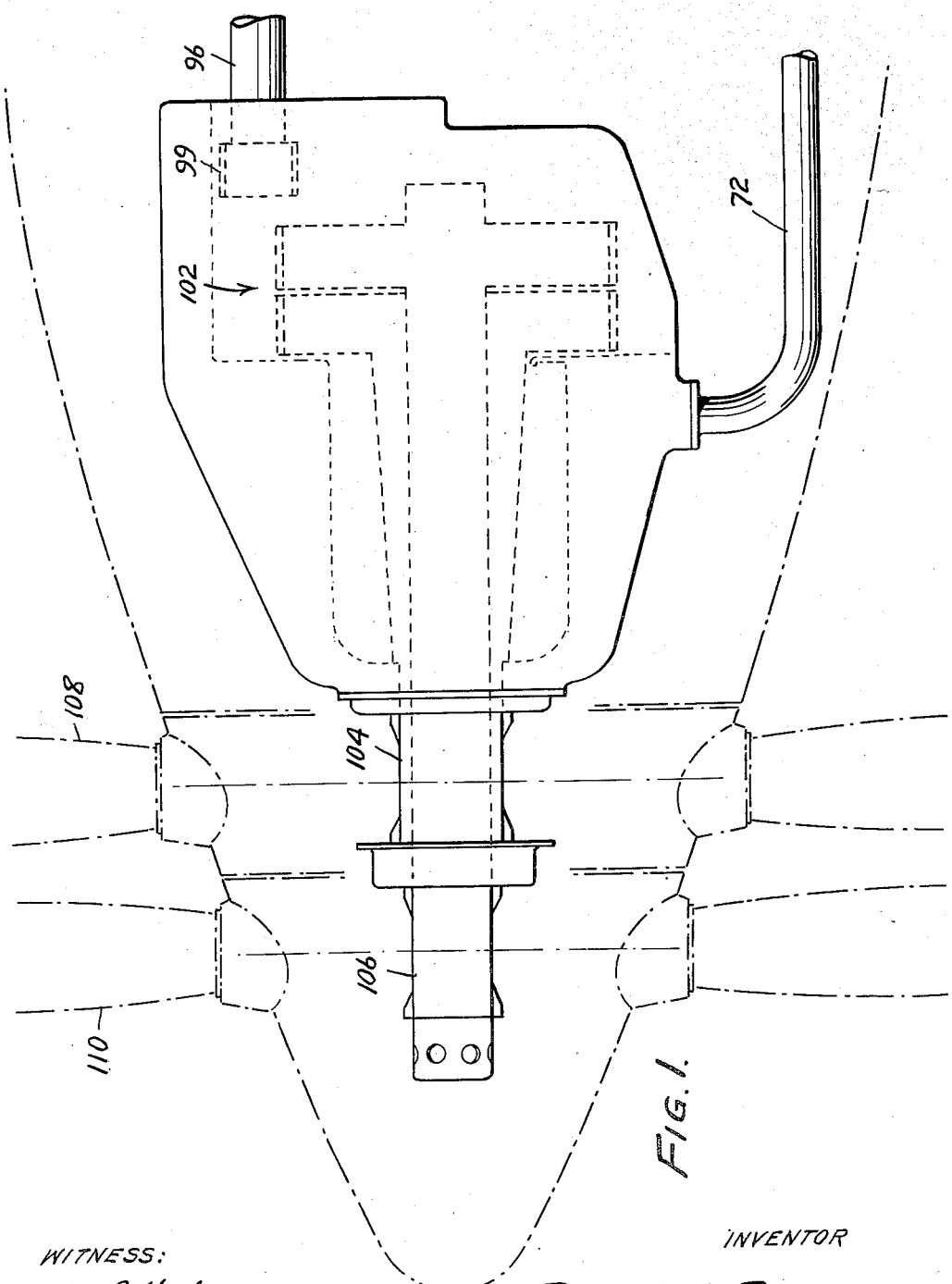
Figure 1 is an elevation, partly diagrammatic, indicating the fashion in which the improved power plant is geared to a pair of propellers.

A forward extension of the compressor shaft drives through suitable reduction gearing in the housing 75 an oil pump 70, delivering oil through a suitable connection to the propeller reduction gearing of Figure 1. The return oil passage is indicated at 72.

Referring again to Figure 3, the gases discharged from the high pressure turbine pass to the gas chest 74 of the low pressure turbine, flowing through adjustable nozzles 76, which will be referred to in detail hereafter, to the primary buckets 78 defined by blading carried by the turbine rotor 80. The gases discharged from these buckets are redeflected in passages 82 and thereafter enter a second series of buckets 84 constituting a fourth turbine stage involving primarily axial flow of gases. From this final stage, the gases flow at high velocity through the tail passage 86 to provide a high velocity propulsion jet.

The low pressure turbine has the same general construction as the high pressure turbine, due account, of course, being taken in its design of the reduced pressure of the combustion gases and their consequent greater volume. Cooling passages 88 in the rotor receive air from passages 90 and 94 extending along the rotor shaft 96 within the elastic bearing 92, the bearing construction being similar to that illustrated at 16. From the passages 88, the air flows through the redirecting passages 98 and thence over the hub of the rotor through the inner portions of the buckets 84.

A bearing 100 forms an additional support for the shaft 96, which continues forwardly to connection with the pinion 99, driving the reduction gearing 102, through intermediate gearing not shown. This reduction gearing serves to rotate in opposite directions the coaxial shafts 104 and 106 to drive in opposite directions at the same angular velocity the twin propellers 108 and 110.

The nozzle passages referred to above are defined by adjustable vanes 76, which are mounted on trunnions 112 and 114, the trunnions 114 being extended and carrying arms 116 engaging within slots in an annular adjustable ring 118, which carries rollers 120, running in tracks 122 in a stationary guide ring 124. Lateral openings 126 displaced from the normal range of movement of the rollers 120 serve for the introduction of the rollers into the track.

The ring 118 is provided with a group of teeth, indicated at 128, meshing with a pinion 130, which is connected to an adjusting arm 132. From the construction just described, it will be evident that movements imparted to the pinion 130 will serve to rotate to a limited degree the ring 118, and through its connection with the arms 116 will serve for the angular displacement of the vanes 76, thereby to adjust, in effect, the angles which the nozzles bear to the entrance portions of the buckets 78. Supporting struts 134 outside the ring of vanes 76 are streamlined as indicated so as not to interfere with smooth flow.

In the operation of the power plant unit described, the control of the nozzles of the second turbine effects control of the unit as a whole in a completely consistent and unitary fashion, to take care of varying conditions of operation. When the nozzle guide vanes 76 are in relatively closed position restricting the nozzle areas, the pressure in the gas chest which feeds them is increased resulting in an allotment of a larger percentage of the energy of expansion to the low pressure turbine. The back pressure on the high pressure turbine is increased and the compressor slows down. This is precisely the condition necessary for both operation at lower than design altitudes and at part loads, since at lower altitudes the system must operate with lower compression ratios and also at part load the same must be true for the compressor to operate within a stable and efficient range.

On the other hand, when the nozzle guide vanes are in relatively open position, the compressor-driving turbine utilizes a greater portion of the available energy, speeding up the compressor and increasing the combustion of fuel in view of thermostatic control of the fuel supply. At the same time, the total energy is so substantially increased that the low pressure turbine receives an increased energy input. Under both conditions there is no loss of energy, both turbines operating at high efficiency. Furthermore, the compressor is operating at maximum efficiency throughout its complete range of speeds; that is, for any speed the volume of air handled is not far from the volume corresponding to the best efficiency for that speed.

The flow of fuel is controlled by the temperature existing, for example, in the gas chest 6 of the first turbine, in which is located a thermostat T, that controls the opening and closing of a valve V in the fuel line 9. Stated simply, if a large quantity of air is being supplied by the compressor, the feed of fuel will correspondingly rise to maintain the thermostatically controlled temperature in the gas chest or elsewhere in the gas passages. On the other hand, when the air supply is diminished by slower operation of the compressor, the fuel is correspondingly cut down, preventing the rise of temperature above the controlled amount which would otherwise result.

It will be evident from the above that a unitary manual control through connection to the lever 132 effects consistent relative operations of the various parts of the power plant, either for purposes of higher speeds of operation of the aircraft or to take care of varying altitude conditions.

While the power plant described has been particularly designed for operation as a complete unit, it will be evident that similar operation will be effected through the single control if, instead of having a burner provided as described, there is interposed between the compressor and the first turbine an internal combustion engine 53, as shown in Figure 6 with the primary idea of supercharging the engine or even with the idea of having an internal combustion engine provide some of the power, with a remaining substantial portion thereof passing to the second turbine either for the production of substantial amounts of mechanical power or minor amounts with the primary production of power by a propulsion jet from a nozzle 57. In such case, the control 132 may be interconnected with the throttle of the engine by connections 133, 133ª and 133ᵇ, although the two controls may be separate to secure proper relative operations.

The advantages of the arrangement of the parts will be evident from consideration of the foregoing description and drawings. The two turbines are so related that there is a minimum length of passage for the combustion gases from the discharge of the first chamber to the nozzles of the second. Likewise, a very compact arrangement of the combustion chamber is afforded, providing smooth flow therethrough from the compressor to the nozzles of the first turbine. At the same time, the arrangement is such as to provide adequate heat insulation between the hot parts and those which are to remain cool, primarily the bearings.

While the control arrangement described above is preferred, it will be evident that other less desirable control arrangements may be used while retaining the advantages of the arrangement of the high pressure turbine to drive the compressor and the low pressure turbine to drive the propeller and/or provide the propulsion jet.

What I claim and desire to protect by Letters Patent is:

1. In combination, a turbine, a compressor driven by said turbine, means for burning fuel in air compressed by said compressor to provide hot combustion gases to drive said turbine, means for reducing the supply of fuel to said burning means when the supply of air thereto is reduced and vice versa, a second turbine rotating independently of the first turbine and arranged for operation through a substantial speed range and determining by its speed its useful variable power output, means for directing to the second turbine gases discharged from the first turbine to drive said second turbine, and adjustable nozzles for controlling the flow of driving gases to said second turbine both to vary the speed of the second turbine and the back pressure on the first turbine, thereby to control the operation of the latter and of its associated compressor, the adjustment of the nozzles changing the flow areas therethrough.

2. In combination, a turbine, a compressor driven by said turbine, means for burning fuel in air compressed by said compressor to provide hot combustion gases to drive said turbine, means responsive to the temperature of said combustion gases to reduce the supply of fuel to said burning means when said temperature rises and vice versa, a second turbine rotating independently of the first turbine and arranged for operation through a substantial speed range and determining by its speed its useful variable power output, means for directing to the second turbine gases discharged from the first turbine to drive said second turbine, and adjustable nozzles for controlling the flow of driving gases to said second turbine both to vary the speed of the second turbine and the back pressure on the first turbine, thereby to control the operation of the latter and of its associated compressor, the adjustment of the nozzles changing the flow areas therethrough.

3. In combination, a turbine, a compressor driven by said turbine and coaxial therewith, means for burning fuel in air compressed by said compressor to provide hot combustion gases to drive said turbine, a second turbine rotating independently of the first turbine and arranged to deliver mechanical power, and means for diverting to the second turbine gases discharged from the first turbine, said turbines having parallel axes and being laterally offset and located closely adjacent each other, said compressor discharging its air into an annular passage, said first turbine receiving its driving gases from an annular passage, and said compressor and first turbine being closely adjacent each other and interconnected by a scroll-like passage substantially tangentially communicating with both said annular passages, surrounding both the axis of the compressor and first turbine and the axis of the second turbine, and containing said means for burning fuel.

4. In combination, a turbine, a compressor driven by said turbine, means for burning fuel in air compressed by said compressor to provide hot combustion gases to drive said turbine, means for reducing the supply of fuel to the burning means when the supply of air thereto is reduced and vice versa, a second turbine rotating independently of the first turbine, means for directing to the second turbine gases discharged from the first turbine to drive said second turbine, and adjustable nozzles for controlling the flow of driving gases to said second turbine, the adjustment of the nozzles changing the flow areas therethrough, said nozzles being arranged to direct the gases to the wheel of the second turbine with a substantial radially inward component of flow, the gas passages of the second turbine receiving the gases during their flow with a substantial radial component of flow.

5. In combination, a turbine, a compressor driven by said turbine, means for burning fuel in air compressed by said compressor to provide hot combustion gases to drive said turbine, means responsive to the temperature of said combustion gases to reduce the supply of fuel to said burning means when said temperature rises and vice versa, a second turbine rotating independently of the first turbine, means for directing to the second turbine gases discharged from the first turbine to drive said second turbine, and adjustable nozzles for controlling the flow of driving gases to said second turbine, the adjustment of the nozzles changing the flow areas therethrough, said nozzles being arranged to direct gases to the wheel of the said turbine with a substantial radially inward component of flow, the gas passages of the second turbine receiving the gases during their flow with a substantial radial component of flow.

RUDOLPH BIRMANN.

REFERENCES CITED

The following references are of record in the file of this patent:

UNITED STATES PATENTS

| Number | Name | Date |
| --- | --- | --- |
| 1,027,698 | Curtis | May 28, 1912 |
| 1,728,719 | Biggs | Sept. 17, 1929 |
| 1,766,886 | Elling | June 24, 1930 |
| 2,078,958 | Lysholm | May 4, 1937 |
| 2,095,991 | Lysholm | Oct. 19, 1937 |
| 2,216,731 | Birmann | Oct. 8, 1940 |
| 2,219,994 | Jung | Oct. 29, 1940 |
| 2,244,467 | Lysholm | June 3, 1941 |
| 2,305,311 | Jendrassik | Dec. 15, 1942 |
| 2,312,605 | Traupel | Mar. 2, 1943 |

FOREIGN PATENTS

| Number | Country | Date |
| --- | --- | --- |
| 367,130 | Great Britain | Feb. 18, 1932 |
| 456,980 | Great Britain | Nov. 16, 1936 |
| 210,659 | Switzerland | Oct. 16, 1940 |